March 3, 1931.  H. C. LORD  1,794,782
JOINT
Filed Oct. 19, 1926

INVENTOR.

Patented Mar. 3, 1931

1,794,782

UNITED STATES PATENT OFFICE

HUGH C. LORD, OF ERIE, PENNSYLVANIA

JOINT

Application filed October 19, 1926. Serial No. 142,714.

This invention is designed to afford a simple joint involving a rubber insulation and which may be readily applied to shafts, or other devices. In carrying forward the invention the joint is split longitudinally and means are provided for securing the split parts together and to associated means. Features and details of the invention will appear from the specification and claims.

One exemplification of the invention is illustrated in the accompanying drawings as follows:—

Figure 1:
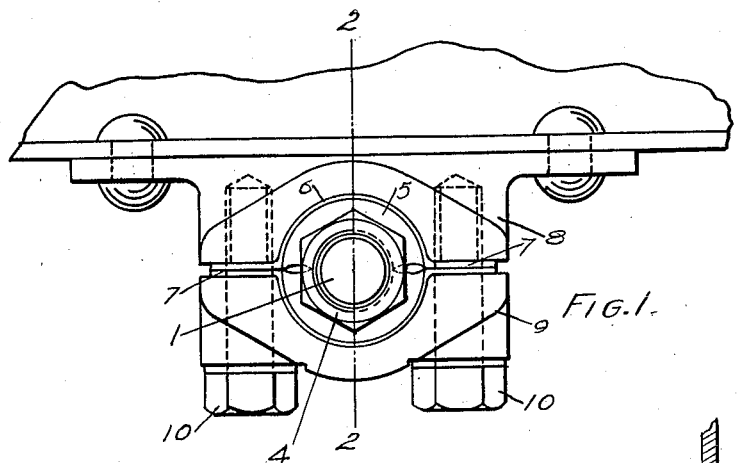

Fig. 1 shows an end view of the joint.

Figure 2:
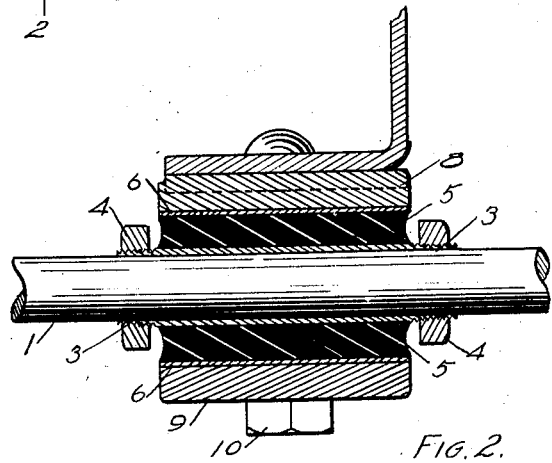

Fig. 2 a section on the line 2—2 in Fig. 1.

Figure 3:
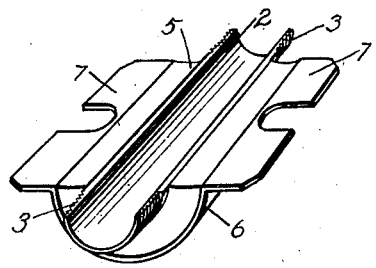

Fig. 3 a detached view of one of the halves of the joint.

1 marks a central rod which may be any shaft, such as a brake lever shaft of an automobile. The inner part 2 of the joint is made in two halves screw threaded at the ends with tapered screws 3 and nuts 4 encircling these ends. By screwing up the nuts the parts of the member 2 are securely clamped to the rod 1.

A rubber insert 5 is preferably secured to the inner member and this may be preferably done by surface bonding during vulcanization.

An outer member 6 is arranged around the rubber and is formed in two halves. The rubber is preferably secured to the inner surface of the shell of the member 6 by surface bonding. The member preferably is provided with outwardly extending flanges 7.

A bracket 8 forming a suitable support receives one half of the joint with the flanges against the opposing faces of the bracket and the cap 9 receives the other half of the joint. A screw 10 extending through the cap 9 into the bracket 8 clamps the parts of the joint outer member together and particularly clamps the flanges 7 rigidly between the bracket faces and the cap faces. Thus a joint is provided which may be utilized for insulation of shock, or it may be used where oscillation of the member is desired in the manner of the joint illustrated in my Patent, #1,452,693, Apr. 24, 1923.

What I claim as new is:—

1. In a joint, the combination of a split inner member; a rubber insert secured to the member; and nuts encircling the ends of the inner member and adapted to clamp the same to a rod.

2. In a joint, the combination of a split inner member; a split outer member, said members comprising metallic parts; and a rubber insert between the members, said rubber insert insulating the parts of the members against metallic contact with each other.

3. In a joint, the combination of a split outer annular member; an inner member, said members comprising metallic parts; and a split rubber insert between said members, said insert insulating the metal parts of the members against metallic contact with each other.

4. In a joint, the combination of a split outer annular member; an inner member, said members comprising metallic parts; and a split rubber insert between said members, the rubber insert being secured to the outer member by surface bonding, and said insert insulating the metal parts of the members against metallic contact with each other.

5. In a joint, the combination of a split inner member; a split outer member, said members comprising metallic parts; and a split rubber insert between the members and secured to the inner member by surface bonding, said insert insulating the metal parts of the members against metallic contact with each other.

6. In a joint, the combination of a split inner member; a split outer member, said members comprising metallic parts; and a split rubber insert between the members, said insert being secured to the inner and outer members by surface bonding, and insulating the metallic parts of the members against metallic contact with each other.

7. In a joint, the combination of a split inner member; a rod on which the inner member is mounted; means clamping the member on the rod; and a rubber insert secured to the member independently of the means.

8. In a joint, the combination of a split inner member; a split outer member, said members comprising metallic parts; a split rubber insert between the members, said insert insulating the metallic parts of the members against metallic contact with each other; and means clamping the parts of the outer member together.

9. In a joint, the combination of a split inner member; a rod on which the inner member is mounted; means clamping the member on the rod; a split outer member, said members comprising metallic parts; means for clamping the parts of the outer member together; and a rubber insert between the members, said insert insulating the metal parts of the members against metallic contact with each other.

10. In a joint, the combination of a split inner member; a rod on which the inner member is mounted; means clamping the member on the rod; a split outer member, said members comprising metallic parts; means for clamping the parts of the outer member together; and a split rubber insert between the members and secured to the members by surface bonding, said insert insulating the metal parts of the members against metallic contact with each other.

11. A joint structure comprising a semi-cylindrical inner member; a semi-cylindrical outer member, said members comprising metallic parts; and a rubber insert between said members and insulating the metallic parts of said members against contact with each other.

12. A joint structure comprising a semi-cylindrical outer member; a semi-cylindrical inner member, said members comprising metallic parts; and a rubber insert between said members, said rubber insert being secured to said members by surface bonding and forming thereby a unitary structure and insulating the metallic parts of the members against metallic contact with each other.

13. A joint structure comprising a semi-cylindrical inner member; a semi-cylindrical outer member, said outer member having radially extending flanges in alinement with the axis, said members comprising metallic parts; and a rubber insert secured to said members by surface bonding, said insert insulating the metallic parts of the members against metallic contact with each other and being shorter than the inner member.

In testimony whereof I have hereunto set my hand.

HUGH C. LORD.